United States Patent
Thor (10) Patent No.: US 8,108,112 B2
(45) Date of Patent: Jan. 31, 2012

(54) ENGINE CONTROL DURING COASTING EVENTS

(75) Inventor: Todd J. Thor, Byron, MI (US)

(73) Assignee: GM Global Technology Operations LLC ( * ) Notice: Subject to any disclaimer, the term of this patent is extended or adjusted under 35 U.S.C. 154(b) by 791 days.

(21) Appl. No.: 12/190,147

(22) Filed: Aug. 12, 2008

(65) Prior Publication Data

US 2009/0240407 A1 Sep. 24, 2009

Related U.S. Application Data

(60) Provisional application No. 61/037,452, filed on Mar. 18, 2008.

(51) Int. Cl.
*F02D 41/00* (2006.01)

(52) U.S. Cl. .......................................... 701/54; 701/104

(58) Field of Classification Search .................. 701/103, 701/54, 104, 105; 123/328, 329
See application file for complete search history.

(56) References Cited

U.S. PATENT DOCUMENTS

| | | | | |
|---|---|---|---|---|
| 4,078,631 A * | 3/1978 | Kadota et al. | ................. | 180/179 |
| 4,445,477 A * | 5/1984 | Ikeura | ...................... | 123/406.53 |
| 4,829,853 A * | 5/1989 | Sakaguchi | ..................... | 477/114 |
| 4,846,127 A * | 7/1989 | Miyama et al. | ............... | 123/325 |
| 5,443,148 A * | 8/1995 | Shi | ................ | 192/48.2 |
| 5,490,815 A * | 2/1996 | Kato et al. | .................... | 477/181 |
| 5,944,766 A * | 8/1999 | White | ............................ | 701/94 |
| RE37,469 E * | 12/2001 | Toukura | ......................... | 477/47 |
| 6,474,297 B1* | 11/2002 | De | .................. | 123/325 |
| 6,641,505 B2* | 11/2003 | Sayman et al. | ............... | 477/177 |
| 7,213,570 B2* | 5/2007 | Zhang | ........................... | 123/399 |
| 2003/0182047 A1* | 9/2003 | Boyer et al. | ................. | 701/103 |
| 2004/0102288 A1* | 5/2004 | Ayabe et al. | ................... | 477/117 |
| 2007/0044758 A1* | 3/2007 | Zhang | .......................... | 123/350 |

* cited by examiner

*Primary Examiner* — Khoi Tran
*Assistant Examiner* — Jason Holloway (57) ABSTRACT

An engine control system comprises a coasting identification module, a throttle adjustment module, and a fuel adjustment module. The coasting identification module selectively identifies a coasting event. The throttle adjustment module increases an opening of a throttle valve during the coasting event. The fuel adjustment module decreases fuel provided to an engine during the coasting event.

21 Claims, 5 Drawing Sheets

ENGINE CONTROL DURING COASTING EVENTS

CROSS-REFERENCE TO RELATED APPLICATIONS

This application claims the benefit of U.S. Provisional Application No. 61/037,452, filed on Mar. 18, 2008. The disclosure of the above application is incorporated herein by reference.

FIELD

The present disclosure relates to vehicles and more particularly to engine control systems for vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
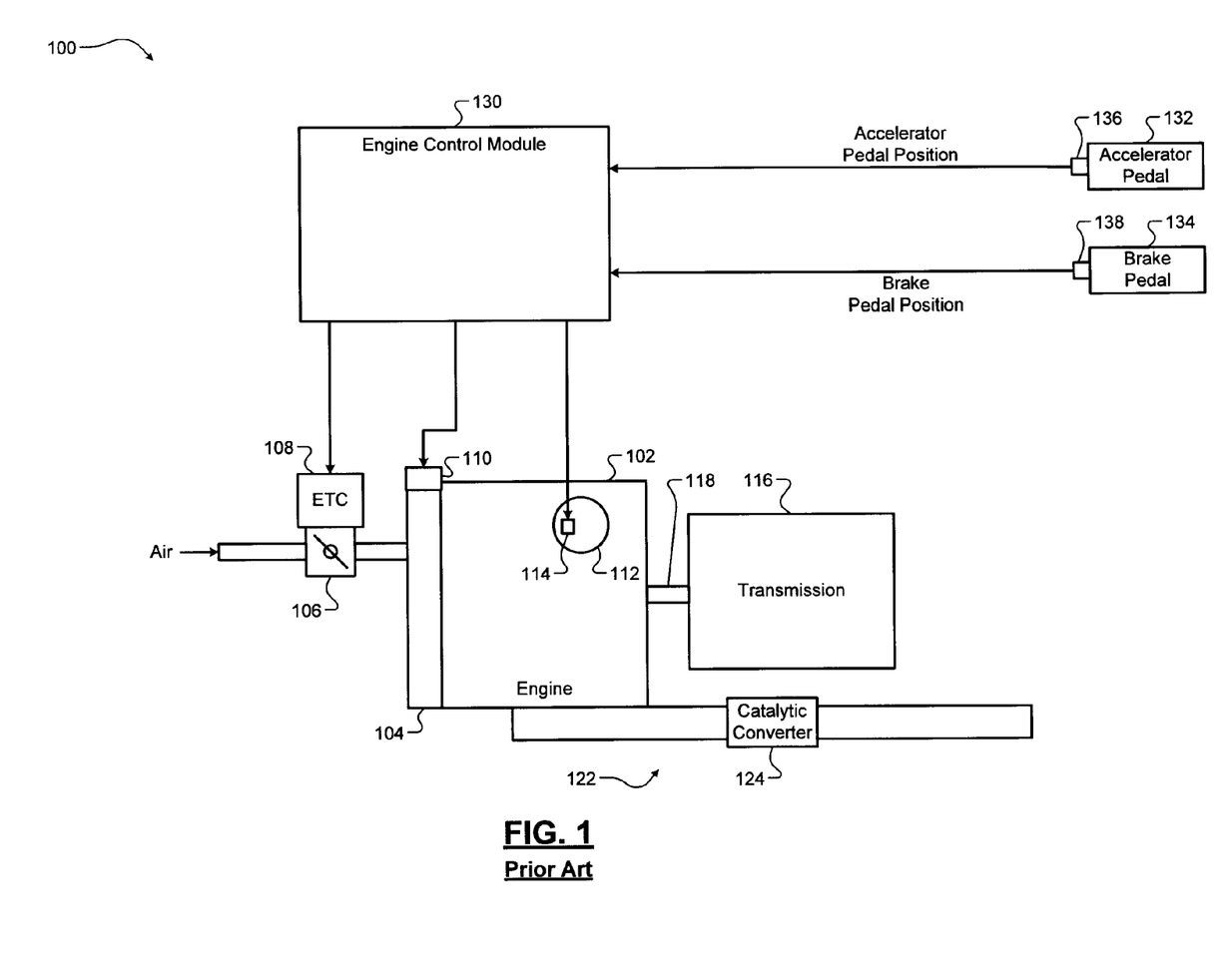
FIG. 1 is a functional block diagram of an engine system according to the prior art.

Referring now to FIG. 1, a functional block diagram of an engine system 100 for a vehicle is presented. The engine system 100 includes an engine 102 that produces drive torque. Air is drawn into the engine 102 through an intake manifold 104. A throttle valve 106 varies the volume of air drawn into the intake manifold 104. The throttle valve 106 is actuated by an electronic throttle controller (ETC) 108, thereby controlling opening of the throttle valve 106. The air mixes with fuel from a fuel injector 110 to form an air and fuel mixture.

The air/fuel mixture is combusted within one or more cylinders of the engine 102, such as cylinder 112. In various engine systems, such as the engine system 100, combustion is initiated by spark provided by a spark plug 114. Combustion of the air/fuel mixture produces torque. The engine 102 may transfer torque to a transmission 116 via a crankshaft 118. The transmission 116 drives one or more wheels of the vehicle.

Exhaust gas resulting from combustion is expelled from the cylinders to an exhaust system 122. The exhaust system 122 includes a catalytic converter 124 that is disposed in the stream of the exhaust gas. The catalytic converter 124 includes one or more catalysts that react with exhaust gas passing through the catalytic converter 124.

An engine control module (ECM) 130 controls torque output by the engine 102. For example, the ECM 130 may control torque output by the engine 102 by controlling the throttle valve 106, the fuel injector 110, and/or the spark plug 114. The ECM 130 may control torque output by the engine 102 based on a driver input, such as actuating an accelerator pedal 132 and/or a brake pedal 134.

An accelerator pedal position sensor 136 provides the ECM 130 with a signal indicating position of the accelerator pedal 132. Similarly, a brake pedal position sensor 138 provides the ECM 130 with a signal indicating position of the brake pedal 134. For example only, the ECM 130 may decrease torque output by the engine 102 when the driver removes pressure from the accelerator pedal 132.

SUMMARY

An engine control system comprises a coasting identification module, a throttle adjustment module, and a fuel adjustment module. The coasting identification module selectively identifies a coasting event. The throttle adjustment module increases an opening of a throttle valve during the coasting event. The fuel adjustment module decreases fuel provided to an engine during the coasting event.

A system comprises the engine control system, the engine and a transmission. The transmission has an input shaft that is engaged with an output shaft of the engine during a coasting event.

In further features, the coast identification module identifies the coasting event based on an accelerator pedal position and a brake pedal position. In still further features, the engine control system further comprises a disable module. The disable module disables the coasting identification module when an output speed of a transmission is less than a predetermined speed.

In other features, the throttle adjustment module opens the throttle valve to a wide open throttle (WOT) position during the coasting event. In still other features, the fuel adjustment module decreases the fuel based on at least one of intake air temperature (IAT) and mass airflow (MAF) during the coasting event.

In further features, the fuel is decreased based on an estimated amount of fuel required to maintain a temperature of a catalyst of a catalytic converter greater than a predetermined temperature. In still further features, the fuel adjustment module disables the fuel during the coasting event.

In other features, the engine control system further comprises a spark timing adjustment module that retards spark timing relative to a predetermined spark timing during the coasting event. In further features, the predetermined spark timing is based on a maximum brake torque (MBT) spark timing. In still further features, the spark timing adjustment module disables the spark during the coasting event.

A method comprises selectively identifying a coasting event, increasing an opening of a throttle valve during the coasting event, and decreasing fuel provided to an engine during the coasting event.

In further features, an input shaft of a transmission is engaged with an output shaft of the engine during the coasting event.

In other features, the coasting event is identified based on an accelerator pedal position and a brake pedal position. In further features, the method further comprises preventing the identification of the coasting event when an output speed of a transmission is less than a predetermined speed.

In still other features, the increasing the opening of the throttle valve comprises opening the throttle valve to a wide open throttle (WOT) position during the coasting event.

In other features, the fuel is decreased based on at least one of intake air temperature (IAT) and mass airflow (MAF) during the coasting event. In further features, the fuel is decreased based on an estimated amount of fuel required to maintain a temperature of a catalyst of a catalytic converter greater than a predetermined temperature. In still further features, the decreasing the fuel provided during the coasting event comprises disabling the fuel.

In further features, the method further comprises retarding spark timing relative to a predetermined spark timing during the coasting event. In still further features, the predetermined spark timing is based on a maximum brake torque (MBT) spark timing. In other features, the method further comprises disabling spark during the coasting event.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine produces torque and a transmission transfers torque to one or more wheels of a vehicle. An engine controller may regulate torque output by the engine based on driver inputs, such as a driver actuating an accelerator pedal. In some circumstances, the driver may remove pressure from the accelerator pedal. When this happens, the vehicle coasts.

Generally, the engine controller regulates the opening of a throttle valve based on the position of the accelerator pedal. For example, the engine controller may decrease the opening of the throttle valve when the driver removes pressure from the accelerator pedal. Such a decrease in the opening of the throttle valve may occur during a coasting event.

Closing the throttle valve, however, obstructs airflow into the engine, thereby impeding the engine's ability to produce torque. As the engine's torque production capability is limited, the vehicle may decelerate at a faster rate when the throttle valve is closed. This deceleration may be significant when the transmission does not include an overrun clutch that disengages the transmission from the engine when the engine speed is less than the transmission speed. Additionally, closing the throttle valve without reducing the amount of fuel that is injected may cause an increase in emissions.

Accordingly, the engine controller according to the present disclosure increases the opening the throttle valve during a coasting event. Additionally, the engine controller may reduce the amount of fuel injected and/or adjust spark timing, such as retarding spark timing, during the coasting event. By opening the throttle valve, reducing the amount of fuel injected, and/or adjusting the spark timing, the engine controller may allow the vehicle to coast while maximizing fuel economy in vehicles having a transmission that does not include an overrun clutch.

Figure 2:
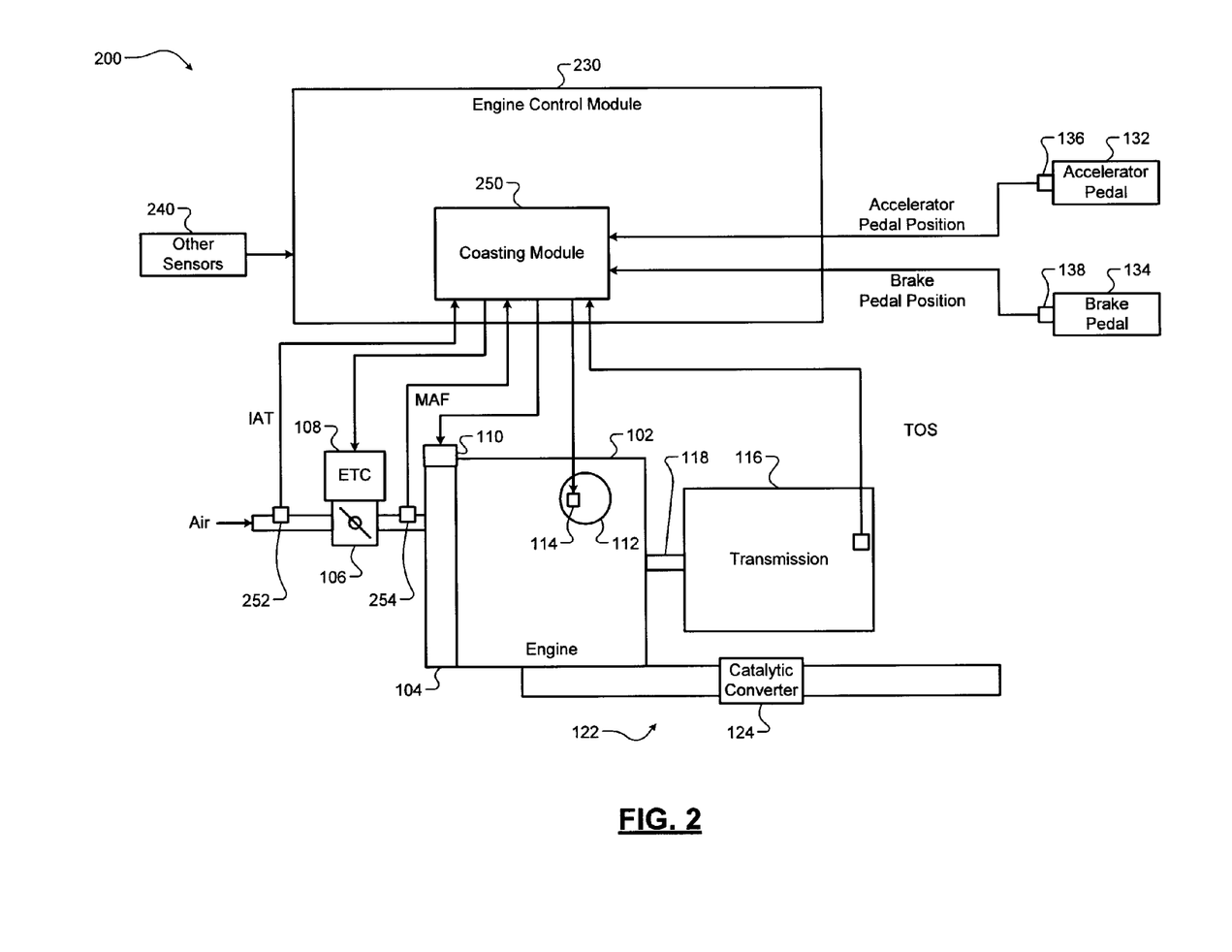
FIG. 2 is a functional block diagram of an exemplary engine system according to the principles of the present application.

Referring now to FIG. 2, a functional block diagram of an exemplary engine system 200 is presented. The engine system 200 includes the engine 102 that combusts an air/fuel mixture to produce drive torque for the vehicle. Air is drawn into the intake manifold 104 through the throttle valve 106. The electronic throttle controller (ETC) 108 controls the opening of the throttle valve 106.

An engine control module (ECM) 230 regulates opening of the throttle valve 106 via the ETC 108. In this manner, the ECM 230 controls the amount of air drawn into the intake manifold 104 and the engine 102. Air from the intake manifold 104 is drawn into cylinders of the engine 102. While the engine 102 may include multiple cylinders, for illustration purposes, only the representative cylinder 112 is shown. For example only, the engine 102 may include 2, 3, 4, 5, 6, 8, 10, and/or 12 cylinders.

The ECM 230 also controls the amount of fuel injected by the fuel injector 110. For example, the ECM 230 may generate a pulse for a predetermined period of time. The fuel injector 110 may open while the pulse is generated. Accordingly, the amount of fuel injected by the fuel injector 110 may be adjusted based on the length of the pulse (i.e., the pulse width). The fuel injector 110 may inject fuel into the intake manifold 104 at a central location or at multiple locations, such as near the intake valve of each of the cylinders. Alternatively, the fuel injector 110 may inject fuel directly into the cylinders. In various implementations, one fuel injector is provided for each cylinder.

The injected fuel mixes with the air and creates the air/fuel mixture. A piston (not shown) compresses the air/fuel mixture within the cylinder 112. The spark plug 114 is energized, thereby igniting the air/fuel mixture. The timing of the energization of the spark plug 114 may be referred to as spark timing. The spark timing may be specified relative to a predetermined position of the piston, such as piston top-dead-center (TDC). Although the engine 102 is depicted as including the spark plug 114, the engine 102 may be any suitable type of engine, such as a compression combustion type engine or a hybrid type engine and may not include the spark plug 114.

Combustion of the air/fuel mixture drives the piston down, rotatably driving a crankshaft (not shown), thereby producing torque. The engine 102 may transfer torque to the transmission 116 via the crankshaft 118. The transmission 116 may then transfer torque to one or more wheels of the vehicle.

The byproducts of combustion (i.e., exhaust gas) are expelled from the cylinder 112 into the exhaust system 122. The exhaust system 122 includes the catalytic converter 124 that includes one or more catalysts that react with passing exhaust gas. The catalysts may operate optimally when the temperature of the catalysts is greater than a predetermined temperature.

The ECM 230 regulates the torque output of the engine 102 based on signals from sensors, such as an intake air temperature (IAT) sensor 252 and/or a mass airflow (MAF) sensor 254. Additionally, the ECM 230 may regulate the torque output of the engine 102 based on signals from other sensors 240. For example only, the other sensors 240 may include a manifold absolute pressure (MAP) sensor, an engine coolant temperature (ECT) sensor, and/or an oil temperature sensor.

The ECM 230 may adjust the torque output of the engine 102 by adjusting one or more engine parameters. For example only, the ECM 230 may adjust the torque output of the engine 102 by adjusting the opening of the throttle valve 106, the amount of fuel injected by the fuel injector 110, and/or the spark timing. The torque output of the engine 102 may be increased by, for example, increasing the opening of the throttle valve 106.

The ECM 230 also regulates the torque output of the engine 102 based on one or more driver inputs. For example only, the driver inputs may include a driver actuating an accelerator pedal 232 and/or a brake pedal 134. The ECM 230 receives an accelerator pedal position signal from an accelerator pedal position sensor 136, which indicates position of the accelerator pedal 132. Similarly, the ECM 230 receives a brake pedal position signal from a brake pedal position sensor 138, which indicates position of the brake pedal 134. For example only, the accelerator and brake pedal positions may be measured relative to respective predetermined positions, such as a position where the corresponding pedal is not being actuated by the driver.

Generally, the ECM 230 instructs the ETC 108 to decrease the opening of the throttle valve 106 when the driver removes pressure from the accelerator pedal 232. Closing the throttle valve 106 restricts the engine's ability to produce torque. The restricted torque production capability may be attributable to, for example, inability of the engine 102 to draw air into the cylinders for combustion. As the torque production capability of the engine 102 is limited when the throttle valve 106 is closed, the speed of the engine 102 slows.

Transmissions may include an overrun clutch that disengages the transmission from the engine when the engine speed is less than the transmission speed. In this manner, the overrun clutch acts as an automatic clutch. For example only, the overrun clutch may disengage such a transmission from the engine when the throttle valve 106 is closed. Accordingly, the overrun clutch allows the vehicle to coast while the throttle valve 106 is closed.

The transmission 116, however, does not include an overrun clutch. The transmission 116 is unable to disengage from the engine 102 when the driver removes pressure from the accelerator pedal 132. The closing of the throttle valve 106 and the inability to disengage may therefore cause the vehicle to decelerate at a faster rate.

The ECM 230 includes a coasting module 250 that selectively identifies occurrence of a coasting event. For example only, the coasting module 250 may diagnose whether a coasting event is occurring based on the position of the accelerator pedal 232 and the position of the brake pedal 234. More specifically, the coasting module 250 may diagnose that a coasting event is occurring when the accelerator pedal 232 is in the predetermined position (e.g., where the accelerator pedal 232 is not being actuated) for a predetermined period of time.

In other implementations, a coasting event may occur when the accelerator pedal 232 is in the predetermined position for the predetermined period and the brake pedal 234 is in a predetermined position during the period. Depression of the brake pedal 234 during that period may indicate that faster deceleration is desired.

The coasting module 250 may also require that the vehicle be moving to identify a coasting event. The coasting module 250 may determine whether the vehicle is moving based on, for example, a transmission output speed (TOS) signal from a TOS sensor 252. For example, the vehicle may be moving when the TOS is greater than a predetermined speed, such as zero. In this manner, the coasting module 250 may refrain determining that a coasting event is occurring when, for example, the driver allows the vehicle to idle.

The coasting module 250 instructs the ETC 108 to increase the opening of the throttle valve 106 during a coasting event. For example only, the coasting module 250 may instruct the ETC 108 to open the throttle valve 106 to a predetermined position. In various implementations, the predetermined position may be a wide open throttle (WOT) position. Positioning the throttle valve 106 in the WOT position may allow the engine 102 to draw air into the cylinders for combustion as freely as possible.

The coasting module 250 also decreases the amount of fuel injected by the fuel injector 110 during the coasting event. For example, the coasting module 250 may decrease the width of the pulse provided to the fuel injector 110. Such a reduction of fuel may allow the coasting module 250 to increase fuel economy when the vehicle is coasting, as the engine 102 is expected to produce a decreased amount of torque during a coasting event. The coasting module 250 may also adjust the spark timing during the coasting event. For example, the coasting module 250 may retard the spark timing (relative to a predetermined spark timing). Such an adjustment may also reduce the amount of torque produced by the engine 102.

In other implementations, the coasting module 250 may eliminate the provision of spark and/or fuel. Accordingly, the coasting module 250 may completely eliminate combustion within the engine 102 during a coasting event. Eliminating the provision of fuel during coasting events maximizes fuel economy. However, eliminating combustion may impact emissions. For example, as stated above, the catalysts of the catalytic converter 124 may operate optimally when the catalyst temperature is greater than a predetermined temperature. Limiting or eliminating combustion, combined with the increased airflow through the engine 102, may cause the temperature of the catalysts of the catalytic converter 124 to fall below the predetermined temperature.

Accordingly, the coasting module 250 may adjust the amount of fuel injected and/or the spark timing to maintain the temperature of the catalytic converter 124 at or above the predetermined temperature. In various implementations, the coasting module 250 may determine the appropriate fuel injection pulse width and spark timing based on mass airflow (MAF) into the engine 102 and/or intake air temperature (IAT). The mass airflow rate may be measured by the MAF sensor 254, and the IAT may be measured by the IAT sensor 252. In various implementations, the catalyst temperature may be sufficient to initiate combustion of any passing fuel. In such implementations, the coasting module 250 may eliminate spark, as combustion of the fuel by the catalysts may be sufficient to maintain the temperature of the catalysts.

Figure 3:
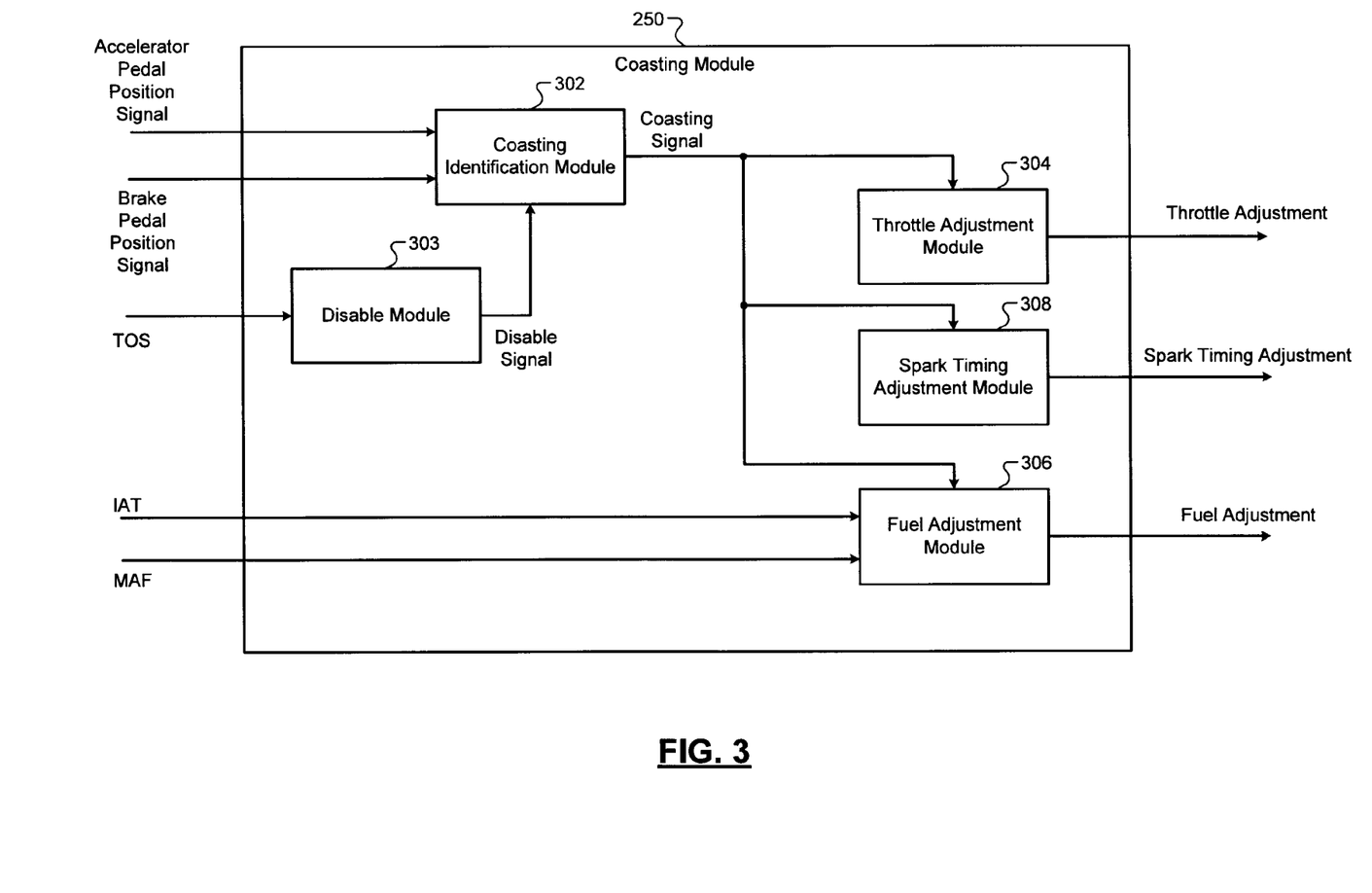
FIG. 3 is a functional block diagram of an exemplary implementation of a coasting module according to the principles of the present application.

Referring now to FIG. 3, a functional block diagram of an exemplary implementation of the coasting module 250 is presented. The coasting module 250 includes a coasting identification module 302, a throttle adjustment module 304, a fuel adjustment module 306, and a spark timing adjustment module 308. The coasting identification module 302 receives the accelerator pedal position signal from the accelerator pedal position sensor 236 and the brake pedal position signal from the brake pedal position sensor 238.

The coasting identification module 302 selectively identifies a coasting event based on the accelerator pedal position and/or the brake pedal position. More specifically, the coasting identification module 302 may identify a coasting event when the accelerator pedal 232 is in a predetermined position for a period of time. The predetermined position may correspond to a position of the accelerator pedal 232 at which the accelerator pedal 232 is not being actuated. For example only, the period of time may be two seconds. The coasting identification module 302 may also require that the brake pedal 234 be in a predetermined position during the period. For example only, the predetermined brake pedal position may be a position at which the brake pedal 234 is not being actuated. The coasting identification module 302 generates a coasting signal when the coasting event is identified.

The coasting module 250 may also include a disable module 303 that selectively disables the coasting identification module 302 when the TOS is less or equal to a predetermined speed. For example only, the predetermined speed may be zero. The disable module 303 may be implemented to prevent the coasting identification module 302 from identifying a coasting event when, for example, the vehicle is idling in park.

The throttle adjustment module 304 instructs the ETC 108 to increase the opening of the throttle valve 106 during a coasting event. For example only, the throttle adjustment module 304 may instruct the ETC 108 to open the throttle valve 106 to a predetermined position such as the wide open throttle (WOT) position.

The fuel adjustment module 306 adjusts the pulse width of the signal applied to the fuel injector 110 during the coasting event. For example only, the fuel adjustment module 306 may adjust the pulse width to a predetermined pulse width or may eliminate fueling. Accordingly, the fuel adjustment module 306 reduces the amount of fuel injected by the fuel injector 110 during the coasting event.

The spark timing adjustment module 308 adjusts the spark timing during the coasting event. The spark timing adjustment module 308 may adjust the spark timing by, for example, retarding the spark timing. For example, the spark timing may be set to a spark timing at which the engine 102 may produce a maximum amount of torque during normal engine operation. This spark timing may be referred to as a maximum brake torque (MBT) spark timing. The spark timing adjustment module 308 may retard the spark timing a predetermined amount relative to the MBT spark timing. In other implementations, the spark timing adjustment module 308 may disable spark.

As stated above, opening the throttle valve 106 may cause the temperature of the catalysts of the catalytic converter 124 to fall below a predetermined temperature. The catalytic converter 124 may operate optimally when the catalyst temperature is greater than the predetermined temperature. Accordingly, the coasting module 250 may take measures to ensure that the temperature of the catalysts remains at or above the predetermined temperature during the coasting event.

For example only, the fuel adjustment module 306 may adjust the amount of fuel injected to maintain the catalyst temperature above the predetermined temperature. The fuel adjustment module 306 may adjust fueling based upon the IAT and/or the MAF. The spark timing adjustment module 308 may also adjust the spark timing to provide combustion within the engine 102 sufficient to maintain the catalyst temperature above the predetermined temperature. The catalyst temperature, however, may be independently sufficient to initiate combustion of any passing fuel. Accordingly, the spark timing adjustment module 308 may disable spark, thereby eliminating combustion within the engine 102.

Figure 4A:
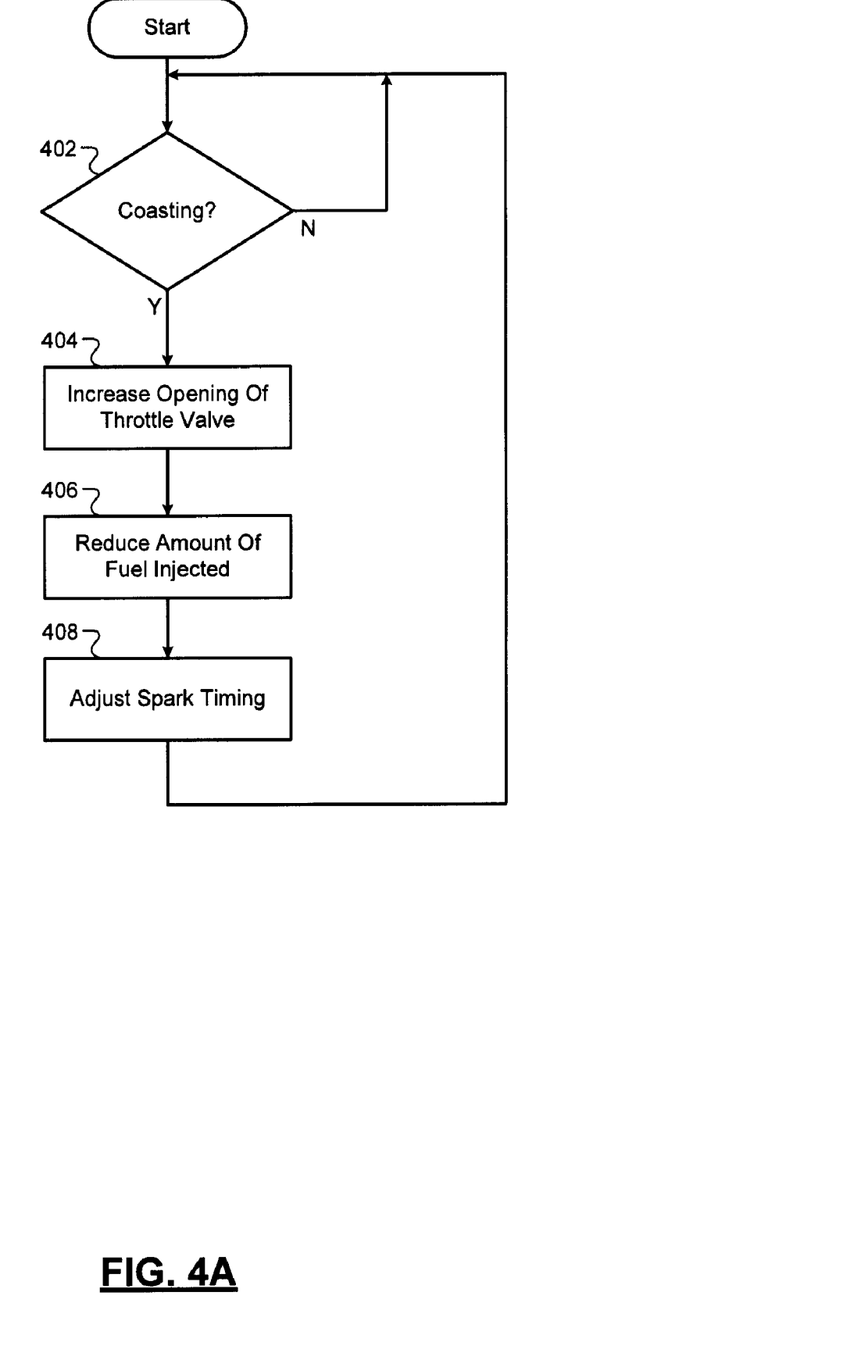
FIGS. 4A-4B are flowcharts depicting exemplary steps performed by coasting modules according to the principles of the present application.

Referring now to FIG. 4A, a flowchart depicting exemplary steps performed by the coasting module 250 is presented. Control begins in step 402 where control determines whether a coasting event is occurring. If so, control continues in step 404; otherwise, control remains in step 402. For example only, control may determine that a coasting event is occurring when the accelerator pedal 232 is in the predetermined position for a predetermined period of time and the brake pedal 234 is not actuated during that period of time. Additionally, control may refrain from determining that a coasting event is occurring when the TOS is less than or equal to a predetermined speed, such as zero.

In step 404, control increases the opening of the throttle valve 106. For example only, control may instruct the ETC 108 to open the throttle valve 106 to a predetermined throttle position such as the WOT position. Control continues in step 406 where control reduces the amount of fuel injected. During the coasting event, a reduced amount of torque may be required. Accordingly, the amount of fuel injected may be reduced during the coasting event to increase fuel economy while providing the reduced amount of torque.

Control then continues in step 408 when control adjusts the spark timing. For example only, control may adjust the spark timing by retarding the spark timing relative to a predetermined spark timing, such as the MBT spark timing. Control then returns to step 402.

Figure 4B:
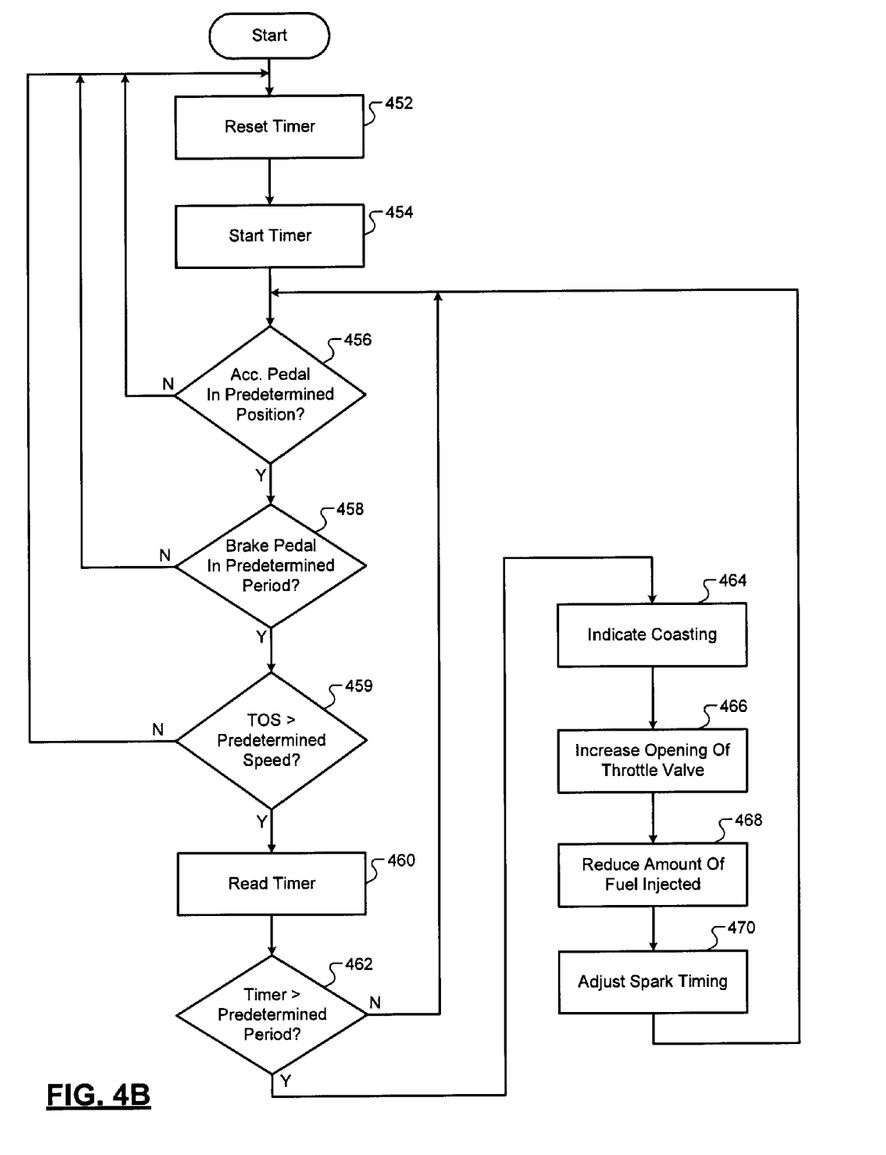

Referring now to FIG. 4B, another flowchart depicting exemplary steps performed by the coasting module 250 is presented. Control begins in step 452 where control resets a timer. Control resets the timer to a predetermined value, such as zero. In this manner, control initializes the timer. Control then continues in step 454 where control starts the timer. The timer tracks how long the accelerator pedal 232 has been in a predetermined position.

In step 456, control determines whether the accelerator pedal 232 is in the predetermined position. If so, control continues to step 458; otherwise, control returns to step 452. For example only, this predetermined position may correspond to a position where the accelerator pedal 232 is not being actuated.

Control continues in step 458 where control determines whether the brake pedal 234 is in the predetermined position. If so, control continues to step 459; otherwise, control returns to step 452. For example only, this predetermined position may correspond to a position where the brake pedal 234 is not being actuated. In other implementations, control proceeds from step 458 to step 460 if the brake pedal 234 is in the predetermined position. In step 459, control determines whether the transmission output speed (TOS) is greater than a predetermined speed. If so, control continues to step 460; otherwise, control returns to step 452.

In step 460, control reads the timer. As stated above, the timer tracks the period of time that the accelerator pedal 232 has been in the predetermined position. Control continues in step 462 where control determines whether the timer is greater than a predetermined period. If so, control continues to step 464; otherwise, control returns to step 456. In step 464, control indicates that a coasting event is occurring. In this manner, control indicates that a coasting event is occurring after the accelerator pedal 232 has been in the predetermined position for a predetermined period of time and the brake pedal 234 has not been actuated during that period of time.

In step 466, control increases the opening of the throttle valve 106. For example only, control may instruct the ETC 108 to open the throttle valve 106 to a predetermined throttle position or to a position where the throttle valve 106 is open as much as possible. Control continues in step 468 where control reduces the amount of fuel injected. As the coasting event is occurring, a reduced amount of torque may be required. Accordingly, control may reduce the amount of fuel injected to increase fuel economy while providing the reduced amount of torque.

Control then continues in step 470 when control adjusts the spark timing. For example only, control may adjust the spark timing by retarding the spark timing relative to a predetermined spark timing, such as the MBT spark timing. Retarding the spark timing reduces the torque output of the engine 102. Control then returns to step 456.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   a coasting identification module that selectively identifies a coasting event based on an accelerator pedal position and a brake pedal position,
   wherein an input shaft of a transmission is engaged with an output shaft of an engine during said coasting event;
   a disable module that disables said coasting identification module when an output speed of a transmission is less than a predetermined speed;
   a throttle adjustment module that increases an opening of a throttle valve during said coasting event; and
   a fuel adjustment module that decreases fuel provided to said engine during said coasting event.

2. The engine control system of claim 1 wherein said throttle adjustment module opens said throttle valve to a wide open throttle (WOT) position during said coasting event.

3. The engine control system of claim 1 wherein said fuel adjustment module decreases said fuel based on at least one of intake air temperature (IAT) and mass airflow (MAF) during said coasting event.

4. The engine control system of claim 3 wherein said fuel is decreased based on an estimated amount of fuel required to maintain a temperature of a catalyst of a catalytic converter greater than a predetermined temperature.

5. The engine control system of claim 1 wherein said fuel adjustment module disables said fuel during said coasting event.

6. The engine control system of claim 1 further comprising a spark timing adjustment module that retards spark timing relative to a predetermined spark timing during said coasting event.

7. The engine control system of claim 6 wherein said predetermined spark timing is based on a maximum brake torque (MBT) spark timing.

8. The engine control system of claim 6 wherein said spark timing adjustment module disables said spark during said coasting event.

9. A method comprising:
   selectively identifying a coasting event based on an accelerator pedal position and a brake pedal position,
   wherein an input shaft of a transmission is engaged with an output shaft of an engine during said coasting event;
   preventing said identification of said coasting event when an output speed of a transmission is less than a predetermined speed;
   increasing an opening of a throttle valve during said coasting event; and
   decreasing fuel provided to said engine during said coasting event.

10. The method of claim 9 wherein said increasing said opening of said throttle valve comprises opening said throttle valve to a wide open throttle (WOT) position during said coasting event.

11. The method of claim 9 wherein said fuel is decreased based on at least one of intake air temperature (IAT) and mass airflow (MAF) during said coasting event.

12. The method of claim 11 wherein said fuel is decreased based on an estimated amount of fuel required to maintain a temperature of a catalyst of a catalytic converter greater than a predetermined temperature.

13. The method of claim 9 wherein said decreasing said fuel provided during said coasting event comprises disabling said fuel.

14. The method of claim 9 further comprising retarding spark timing relative to a predetermined spark timing during said coasting event.

15. The method of claim 14 wherein said predetermined spark timing is based on a maximum brake torque (MBT) spark timing.

16. The method of claim 9 further comprising disabling spark during said coasting event.

17. An engine control system comprising:
   a coasting identification module that selectively identifies a coasting event;
   a throttle adjustment module that increases an opening of a throttle valve during said coasting event;
   a fuel adjustment module that decreases fuel provided to an engine during said coasting event based on:
      (i) at least one of intake air temperature (IAT) and mass airflow (MAF) during said coasting event; and
      (ii) an estimated amount of fuel required to maintain a temperature of a catalyst of a catalytic converter greater than a predetermined temperature.

18. The engine control system of claim 17 wherein said throttle adjustment module opens said throttle valve to a wide open throttle (WOT) position during said coasting event.

19. The engine control system of claim 17 further comprising a spark timing adjustment module that retards spark timing relative to a predetermined spark timing during said coasting event.

20. The engine control system of claim 19 wherein said predetermined spark timing is based on a maximum brake torque (MBT) spark timing.

21. The engine control system of claim 19 wherein said spark timing adjustment module disables said spark during said coasting event.

* * * * *